Figure 1:
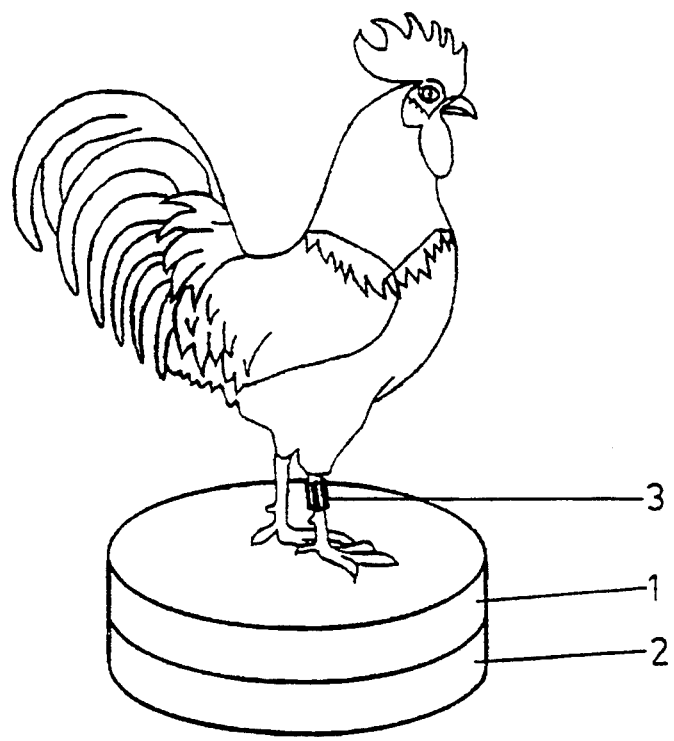

United States Patent [19]

Roosenboom

[11] Patent Number: 5,438,960

[45] Date of Patent: Aug. 8, 1995

[54] DETECTION DEVICE FOR SELECTIVELY DISTINGUISHING FROM EACH OTHER A NUMBER OF GROUPS OF ARTICLES OR ANIMALS

[75] Inventor: Dirk J. Roosenboom, Haaksbergeb, Netherlands

[73] Assignee: N.V. Nederlandsche Apparatenfabriek NEDAP, De Groenlo, Netherlands

[21] Appl. No.: 123,966

[22] Filed: Sep. 21, 1993

[30] Foreign Application Priority Data

Sep. 21, 1992 [NL] Netherlands ............ 9201625

[51] Int. Cl.$^6$ ............................................. A01K 29/00
[52] U.S. Cl. ................... 119/713; 119/842; 209/527
[58] Field of Search .......... 119/51.02, 713, 840, 119/842; 209/527; 340/551

[56] References Cited

U.S. PATENT DOCUMENTS

| | | |
|---|---|---|
| 3,850,145 | 11/1974 | Yoder et al. ............ 119/51.02 |
| 4,617,876 | 10/1986 | Hayes .................... 119/842 |
| 5,001,458 | 3/1991 | Tyrén et al. ............. 340/551 |
| 5,105,763 | 4/1992 | Poiesz et al. ............ 119/51.02 |

FOREIGN PATENT DOCUMENTS

| | | |
|---|---|---|
| 0485039 | 5/1992 | European Pat. Off. . |
| 2546712 | 12/1984 | France . |
| 3810088 | 11/1989 | Germany . |
| 7801639 | 8/1979 | Netherlands . |
| 9002424 | 6/1992 | Netherlands . |

*Primary Examiner*—Robert P. Swiatek
*Attorney, Agent, or Firm*—Jacobson, Price, Holman & Stern

[57] ABSTRACT

A detection and weighing device for selectively distinguishing two groups of animals, such as for instance cocks and hens, one of the groups to be distinguished being provided with a detection element, for instance a label, consisting of or provided with amorphous magnetic material. This material is recognized with the aid of an alternating magnetic field and a receiving coil suitable for that purpose, and the presence or absence of the detection element, together with the weight determined by the weighing device on which the detection system is arranged, indicates whether an animal from one group or the other group is involved, so that, for instance, the average weight of the two groups can be determined. Instead of being used in combination with a weighing device, this detection device can also be used while being coupled to other presence-detection devices. Further, the number of groups to be identified can be enlarged by using amorphous magnetic materials with distinguishable differences in magnetic properties.

12 Claims, 1 Drawing Sheet

DETECTION DEVICE FOR SELECTIVELY DISTINGUISHING FROM EACH OTHER A NUMBER OF GROUPS OF ARTICLES OR ANIMALS

This invention relates to a detection device for selectively distinguishing from each other a number of groups of articles or animals, for instance poultry, at the time when they are located on a weighing unit or on or in or near another presence-detection unit.

At multiplication farms, for instance for chickens, a production group comprises approximately 10% of cocks and 90% of hens. In order to arrange for the fertilization of the eggs to take place as efficiently as possible, the automatic delivery of feed to both the cocks and the hens should be optimally controlled. It should be such that exactly such an amount of food is delivered to the hens and cocks as is necessary for the hens to attain an optimum weight for them to produce eggs and for the cocks to exhibit the greatest sexual activity.

At present there exist systems which make it possible to feed hens and cocks independently in one production group. Also, weighing units are sometimes used, which register the weights of the respective animals automatically. On the basis of the weight data gathered, it can be indicated with the aid of a computer program how much feed is to be assigned to the cocks and hens.

A drawback of the currently existing systems is that the basic assumption that has to be made in this connection is that all the cocks are heavier than the hens.

In practice, however, it is not uncommon for hens to be heavier than cocks. As a consequence, the data gathered are no longer reliable and the existing systems accordingly do not function optimally. Further, weighing the cocks and hens by hand every other week or every two weeks in order to adapt the amount of feed per production group on the basis of the thus-obtained data is very labor-intensive and causes unrest in the group, the consequence being that the production of fertilized eggs is disturbed.

The identification of a characteristic of an animal, such as its sex, for instance, can be used not only for the benefit of weighing the animal to be distinguished, but also in connection with other forms of presence detection, such as for instance presence detection with the aid of infrared light, a photosensitive cell or a switching door mat.

For convenience, the following example is based on a combination of identification system (or detection system) and weighing unit.

The object of the present invention is to remove the above-mentioned drawbacks by means of a detection system or identification system that distinguishes the groups of articles or animals, for instance the sexes of poultry, at the time when they are at a particular location, for instance a weighing unit.

To that end, according to the invention, a detection device for selectively distinguishing from each other a number of groups of articles or animals, in particular suitable for use with poultry, is characterized by an antenna device for generating an alternating magnetic field at a predetermined location; a number of types of detection elements, to be attached to the articles or animals, capable of influencing a magnetic field; a receiving device, coupled with the antenna device, capable of detecting the influence of a detection element on the magnetic field in order to determine the corresponding group of articles or animals.

Hereinafter, the present invention is further described with reference to the accompanying drawings of an exemplary embodiment.

Figure 2:
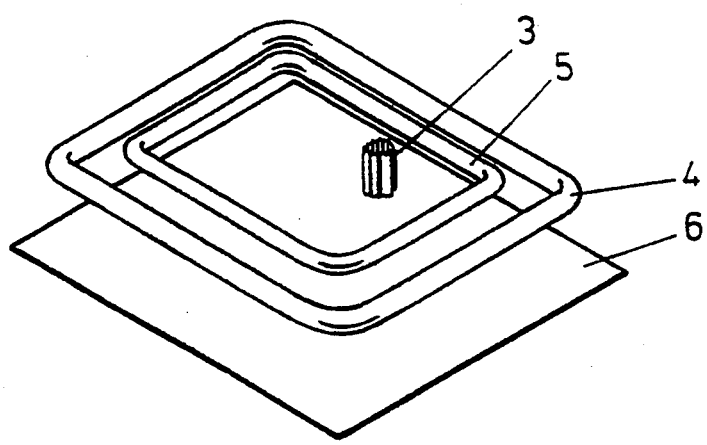

FIG. 1 schematically shows an example of a detection and weighing device according to the invention, suitable for use for poultry; and FIG. 2 schematically shows an example of a part of the internal construction of a system according to the invention.

FIG. 1 schematically shows an example of a device according to the invention, which is suitable for poultry. The device comprises a detection system 1 which is coupled to or integrated in a weighing unit 2. In one of the categories—sexes, in this case—and preferably the category that occurs least frequently within the production group (for instance, the cocks in the above example), a detection element, for instance a leg ring as described in applicant's Dutch patent application no. 9002424, which is incorporated herein by reference, is attached to the animal. The detection system 1 comprises a detection element 3 (responder, transponder), which is attached to the animal, and an antenna system, which is connected with a transmitter which produces a sufficiently strong alternating current which can be converted by the antenna into an alternating magnetic field, also referred to as detection field or interrogating field. The detection element 3, for instance a label, a collar responder or, as shown, a leg ring, includes an element that disturbs the magnetic field in a predetermined manner. When the detection element 3 is located in the magnetic field, a disturbance of the magnetic field will arise. This change in the alternating magnetic field is received by the antenna system, which passes the signal to the receiver. This receiver processes the signal and preferably converts it to a digital signal which can be used, for instance, to control a feeding apparatus. The element disturbing the magnetic field may for instance be a piece of metal or a piece of amorphous magnetic material, but may also be, for instance, an electric resonant circuit which may or may not be provided with a code circuit.

The possible construction of a detection system 1 according to the invention is shown in FIG. 2. The antenna system here comprises a separate transmitting antenna 4 and a separate receiving antenna 5, but may also be constructed as a single antenna with both functions being fulfilled at the same time. The receiving antenna 5 is located within the transmitting antenna 4. This provides the advantage that a detection element 3 is detected only when it is located above the antenna system. A detection element disposed directly next to the construction is not detected.

The metal plate 6 ensures that no detection is possible under the assembly of antennas or under the detection system 1. This also prevents any influence of components located under the detection system 1, for instance the weighing unit 2. The metal plate 6 also prevents the magnetic field of the detection system 1 from having any influence on sensitive electronics that may be present in the weighing unit 2.

If the weight does not have to be determined, a different form of presence detection can be utilized, for instance an infrared barrier, a photosensitive cell, a switching floor element or switching floor mat, etc.

The detection device according to the invention also makes it possible to distinguish more than two groups of animals or articles, provided their number is limited, by using different metals or amorphous magnetic materials which exhibit distinguishable differences in magnetic properties. If resonant circuits are used which have a predetermined resonant frequency for each group or which are coupled with a code circuit which disturbs the interrogating field in a predetermined coded rhythm, many more different groups can be distinguished.

When combined with a weighing device, the device of the present invention makes it possible to determine the average weight of the members belonging to a group. In a similar manner, other average values of measurable characteristics of the members of a group can be determined as well.

I claim:

1. A detection arrangement for automatically distinguishing between cocks and hens in groups of poultry, said detection arrangement comprising:
   a presence detection device for detecting the presence of any animal including said cocks and hens at a predetermined location;
   antenna means for generating an alternating magnetic field at said predetermined location;
   a first plurality of detection elements which are attachable to a leg of a first type of animal, including cocks, and arranged so as to disturb said alternating magnetic field in a first manner when attached to said leg of the first type of animal and located in said predetermined location;
   at least one other plurality of detection elements which are attachable to a leg of at least a second type of animal, including hens, and arranged so as to disturb said alternating magnetic field in a second manner when attached to said leg of said at least second type of animal and located in said predetermined location; and
   a receiver device coupled to said antenna means for detecting disturbances of the magnetic field generated by any one of said detection elements, said receiver device distinguishing between disturbances generated in said first manner and disturbances generated in said second manner to thereby determine whether an animal located in said predetermined location is wearing a detection element from said first plurality of detection elements or from said at least one other plurality of elements, said receiver device thus being able to distinguish between said first type of animal and said at least second type of animal.

2. The detection arrangement according to claim 1, wherein the presence detection device comprises a weighing device.

3. The detection arrangement according to claim 2, wherein the antenna means is mounted substantially horizontally on top of the weighing device.

4. The detection arrangement according to claim 3, wherein the antenna means is electrically shielded from the weighing device.

5. The detection arrangement according to claim 3, wherein the antenna means comprises separate receiving and transmitting antenna loops, and wherein the receiving antenna loop is located within the transmitting antenna loop.

6. A detection device for automatically distinguishing between a number of groups of articles or animals, comprising:
   an antenna device for generating an alternating magnetic field at a predetermined location;
   a device for detecting the presence of an article or animal at the predetermined location;
   a number of types of detection elements for attachment to the articles or animals pursuant to each article's or animal's group affiliation, said detection elements being capable of influencing a magnetic field; and
   a receiving device, coupled with the antenna device, capable of detecting the influence of a detection element on the magnetic field in order to distinguish between said number of groups of articles or animals;
   wherein at least the antenna device is electrically shielded from the device for detecting the presence of an article or animal at said predetermined location, said device for detecting the presence of an article or animal at said predetermined location comprising a weighing device.

7. The detection device according to claim 6, wherein the antenna device is arranged on top of the weighing device.

8. A detection arrangement for automatically distinguishing between types of animals in groups of poultry, said detection arrangement comprising:
   antenna means for generating an alternating magnetic field at a predetermined location;
   at least a first plurality of detection elements which are attachable to a leg of at least a first type of animal, including poultry, and arranged so as to disturb said alternating magnetic field in at least a first manner when attached to said leg of the at least first type of animal and located in said predetermined location;
   a presence detection device for detecting the presence of any animal, including said poultry, at said predetermined location regardless of whether said any animal is wearing one of said detection elements;
   a receiver device coupled to said antenna means for detecting disturbances of the magnetic field generated by any one of said detection elements, and also connected to said presence detection device to thereby determine whether an animal located in said predetermined location is wearing a detection element from said at least first plurality of detection elements, said receiver device thus being able to distinguish between types of animals which are not wearing a detection element from said at least first plurality of detection elements and said at least first type of animal.

9. The detection arrangement according to claim 8, wherein the presence detection device comprises a weighing device.

10. The detection arrangement according to claim 9, wherein the antenna means is mounted substantially horizontally on top of the weighing device.

11. The detection arrangement according to claim 10, wherein the antenna means is electrically shielded from the weighing device.

12. The detection arrangement according to claim 10, wherein the antenna means comprises separate receiving and transmitting antenna loops, and wherein the receiving antenna loop is located within the transmitting antenna loop.

* * * * *